US009485653B2

(12) United States Patent
Melia et al.

(10) Patent No.: US 9,485,653 B2
(45) Date of Patent: Nov. 1, 2016

(54) SECURE SMARTCARD PAIRING

(71) Applicant: Nagravision S.A., Cheseaux-sur-Lausanne (CH)

(72) Inventors: Telemaco Melia, Rolle (CH); Pierre Sarda, Echallens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 20 days.

(21) Appl. No.: 14/205,209

(22) Filed: Mar. 11, 2014

(65) Prior Publication Data

US 2015/0264566 A1    Sep. 17, 2015

(51) Int. Cl.
| H04M 1/66 | (2006.01) |
| H04W 12/06 | (2009.01) |
| H04L 29/06 | (2006.01) |
| H04W 4/20 | (2009.01) |
| H04N 21/418 | (2011.01) |
| H04N 21/4367 | (2011.01) |
| H04W 12/04 | (2009.01) |
| H04W 4/14 | (2009.01) |
| H04W 4/18 | (2009.01) |
| H04W 84/04 | (2009.01) |
| H04W 88/06 | (2009.01) |

(52) U.S. Cl.
CPC .......... *H04W 12/06* (2013.01); *H04L 63/0853* (2013.01); *H04L 63/18* (2013.01); *H04N 21/4181* (2013.01); *H04N 21/4367* (2013.01); *H04W 4/206* (2013.01); *H04W 12/04* (2013.01); *H04W 4/14* (2013.01); *H04W 4/185* (2013.01); *H04W 84/042* (2013.01); *H04W 88/06* (2013.01)

(58) Field of Classification Search
CPC ..................................................... H04N 21/40
USPC ........................................................ 455/410
See application file for complete search history.

(56) References Cited

U.S. PATENT DOCUMENTS

| 2004/0098592 | A1 | 5/2004 | Taki | |
| 2010/0273424 | A1* | 10/2010 | De Petris et al. | 455/41.2 |
| 2011/0085526 | A1* | 4/2011 | Joseph et al. | 370/338 |
| 2012/0246480 | A1 | 9/2012 | Selander et al. | |

OTHER PUBLICATIONS

Maura Turolla, Elisa Alessio, Cellular News, "ZSIM enabling innovative services to improve quality of life", Mar. 16, 2006, Telecom Italia—Innovation & Engineering.*
Maura Turolla, ZSIM at Zigbee Alliance Open House, Sep. 5, 2005, 13 pages, https://docs.zigbee.org/zigbee-docs/dcn/06.*
International Search Report issued in International Application No. PCT/EP2015/055076 dated Jun. 11, 2015.

(Continued)

*Primary Examiner* — Thomas Lett
(74) *Attorney, Agent, or Firm* — DLA Piper LLP US

(57) ABSTRACT

Techniques for pairing two different security modules that use two different encryption technologies for operation in two different networks include generation and transmission of a secret to both the security modules via their respective communication networks. In one advantageous aspect, one of the security module, which may be prone for duplication or theft, is logically tethered to the other security module via the pairing. For example, after pairing is successfully performed, the first security module may be usable in a wide area network only when its presence in a local communication connection, such as a home network of a subscriber, or a peer-to-peer or a near field communication link, can be detected and verified by the second security module.

22 Claims, 5 Drawing Sheets

(56) References Cited

OTHER PUBLICATIONS

Written Opinion issued in International Application No. PCT/EP2015/055076 dated Jun. 11, 2015.

Roger M. Needham et al., "Using Encryption for Authentication in Large Networks of Computers", Communications of the ACM, vol. 21, No. 12, pp. 993-999, Dec. 1978.

\* cited by examiner

SECURE SMARTCARD PAIRING

BACKGROUND

This document relates to secure electronic communication and controlling physical access to a communication network.

Users of satellite services receive multimedia content over a satellite downlink. Some conventional satellite networks were one-way because there did not exist a way for users to communicate back via a two-way communication network to the satellite network. Recent advances in wireless technologies, e.g., 3G and 4G cellular wireless technologies, have made it possible to provide a wireless communication channel via which satellite television users can communicate with the satellite network.

SUMMARY

The present document discloses techniques for secure pairing of two different security modules (e.g., a smartcard) that are operable in two different networks for a paired use. In some implementations, a smartcard, e.g., as used in digital cable or satellite television networks, and a Subscriber Identity Module (SIM) card, e.g., as used in cellular telephone network, are deployed at a user premise and are securely paired together so that the SIM card can be used for wireless communication only as long as it remains paired with the smartcard.

In one aspect, a method is provided for controlling operation of a first security module operable in a first communication network by a second security module operable in a second communication network. The method includes sending an initialization message from the first communication network to the second communication network, the initialization message uniquely identifying the first security module, generating a secret based on the initialization message, communicating the secret to the first security module via the first communication network, transmitting the secret to the second security module via the second communication network; and establishing, using the secret, a secure channel between the second security module and the first security module via a third communication link that is different from the first communication network and the second communication network.

In another aspect, an apparatus for operation in a communication system is disclosed. The apparatus includes a module that sends an initialization message to an application server via a wireless communication network, a module that receives a secret that was generated based on an identity included in the initialization message, a module that establishes a secure communication channel over a home area communication link, and a module that sends an acknowledgement message via the wireless communication network, indicating successful establishment of the secure communication channel.

These, and other, aspects are described below in the drawings, the description and the claims.

BRIEF DESCRIPTION OF THE DRAWINGS

Like reference symbols in the various drawings indicate like elements.

DETAILED DESCRIPTION

With recent advances in digital communication technologies, some traditional communication networks are now being complemented by additional ways to provide data to users and receive data from users. In many locations, e.g., user homes or businesses or public places such as shops and airports, a user may have multiple possibilities to connect to a network such as the Internet. For example, in a user's home, a user may be able to receive audio/video programs and data via a satellite or a cable network. At the same time, a user may be able to receive audio/video programs and data via a wireless cellular network such as a 3G or a 4G network. Similarly, in an airport, a user may be able to establish data connectivity using her cellular data network and/or using a wireless hotspot or a Wi-Fi network.

As another example, some satellite television programming providers may want to complement their satellite communication network with a cellular network to provide an additional way to provide data/content connectivity to user premises. Making available such two-network connectivity may benefit both the users and the network service providers by providing opportunities to provide additional content and services, a reverse channel on which users can communicate with the network, and the possibility of reduced monthly bill for a user by consolidating communication services, among others.

Figure 1:
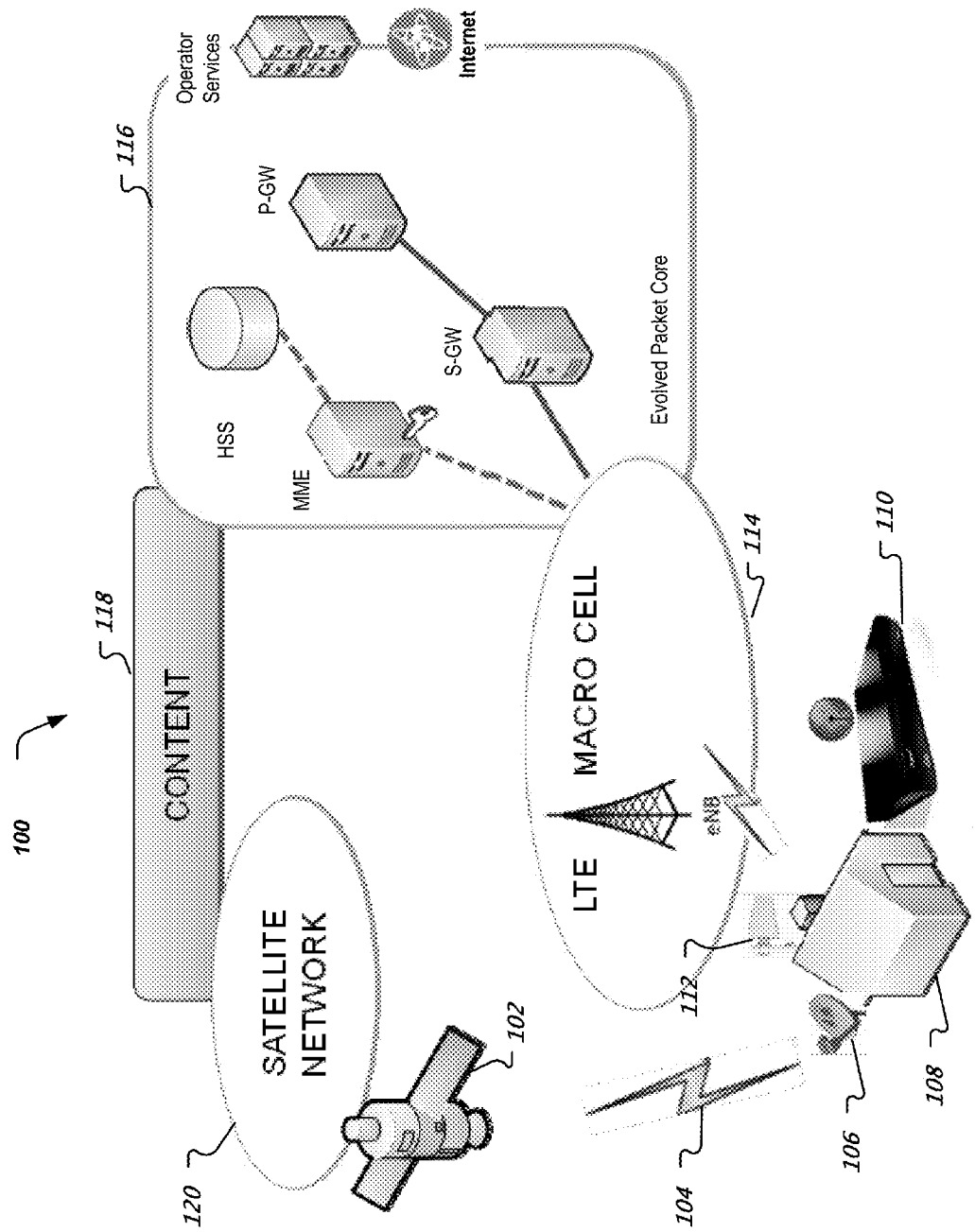
FIG. 1 illustrates an example of a communication system.

FIG. 1 illustrates an example of a communication system 100. A satellite 102 may provide content via a satellite link 104 to a user premise 108. The satellite signal from the satellite 102 may be received via a roof-top antenna 106, e.g., a dish antenna. The user premise may be equipped with a set-top box or a receiver 110 to receive the satellite content carried within the received satellite signal. The receiver 110 may include a decryption subsystem that uses a smartcard to provide conditional access to various television programs being transmitted over the satellite link 104.

The user premise may also be fitted with a second antenna system 112 based on a second wireless communication link different from the satellite link 104. The second antenna system 112 may, e.g., include Long Term Evolution (LTE) transmission/reception and router capability to provide Internet connection by communication with an LTE network 114. The LTE network 114 may include a base station, called enhanced node B (eNB), which controls wireless communication in a macro cell. The eNB may communicate with network infrastructure such as evolved packet core EPC 116 to provide connectivity to the internet and other telephony services. Satellite content 118 that is transported over the satellite network 120, which forms the backbone network for a satellite service provider, may also be available to the EPC 116 (e.g., for fulfilling two-way interactivity by the user).

The LTE router may be equipped with a security module such as the Universal Integrated Circuit Card (UICC), which may be provisioned by the mobile operator (or by the UICC provider). The UICC may provide parameters and credentials, e.g., the International Mobile Subscriber Identity (IMSI) and the authentication key (Ki), used to identify and authenticate the subscriber to the cellular network.

Since the LTE router may be an outdoor unit, with the UICC also located outside a user's home, preventing malicious attacks might be difficult (e.g. during night time). Cloning of the UICC (or of the parameters contained in the UICC) could result in fraudulent use of the system or event UICC sold to the black market. This would have a direct negative impact on the service provided by the network operator to the user.

The present document provides, inter alia, techniques for secure pairing of the UICC, also called LTE USIM (universal subscriber identity module) card with the smartcard module/secured environment in the satellite set-top box.

In some embodiments, the existing and highly secured channel satellite link 104 is used to establish a secured pairing between the UICC and the smartcard (SC). Such pairing, in one aspect, prevents theft of service by a malicious attacker by copying or stealing the UICC and using it for other purposes, for instance by inserting in a 4G enabled smart phone. In another aspect, the pairing may also prevent a user from plugging the UICC in his/her personal mobile phone to get 4G wireless connection while on the move, if not permitted by the network service provider to do so. For example, in deployments where the antenna system 112 is used in a fixed wireless access network, eNBs may be configured with parameters to meet a certain capacity requirement under the assumption that the UICC card is not mobile. In such systems, a user's unauthorized movement of the UICC may lead to misconfigurations and degradation in the quality of service.

In some embodiments, a secure communication between 2 elements (here SIM Card and SC), may be established using a secret shared between both elements. In some embodiments, a secret may be created at the headend of the conditional access system (e.g., satellite network infrastructure). This secret is then shared between the satellite network and the cellular network using a process such as described in this document.

Figure 2:
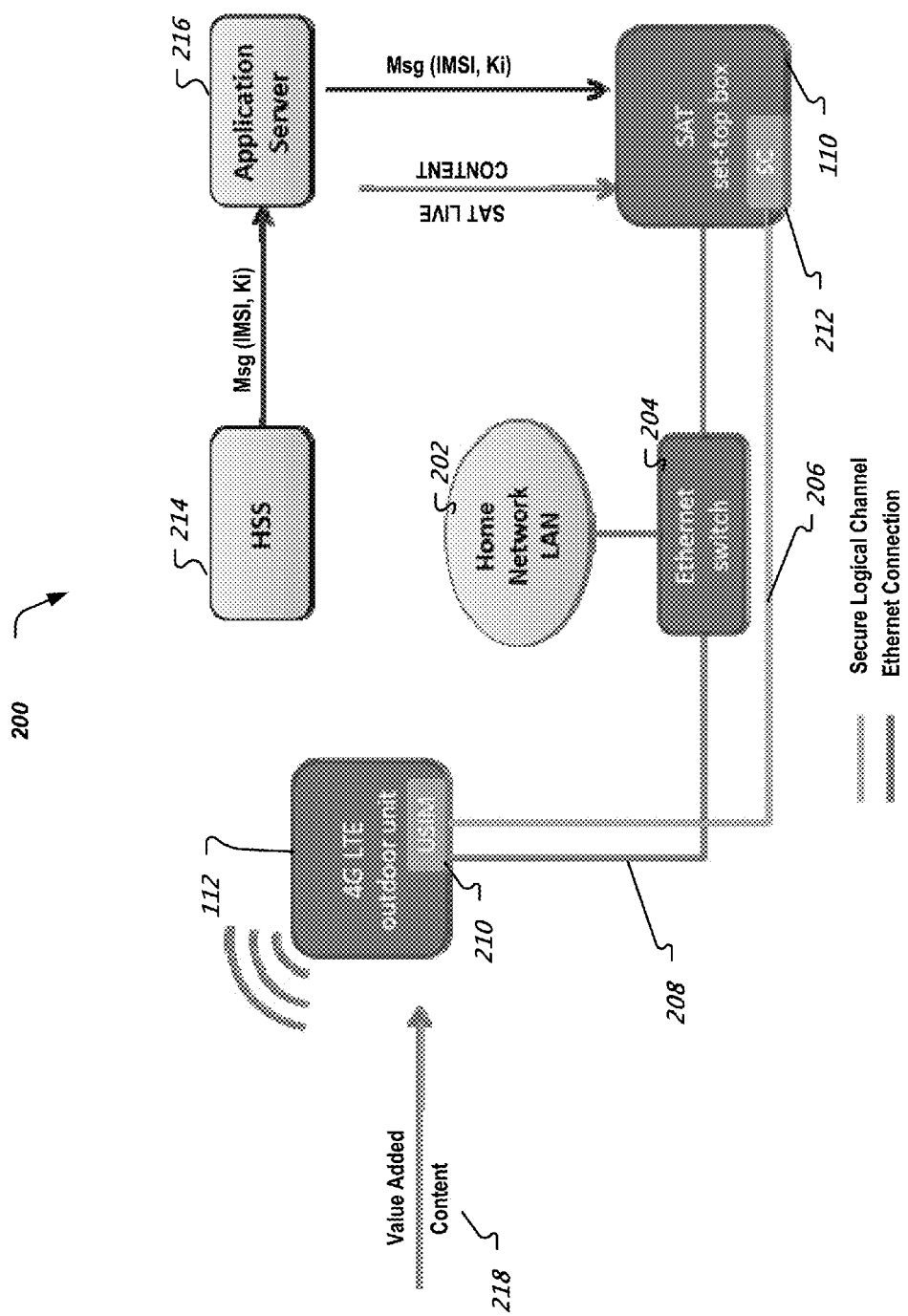
FIG. 2 is a block diagram representation of an example of data flow in a communication network.

FIG. 2 is a block diagram representation of an example of a communication network 200 established for pairing. The satellite set-top box (STB) 110 and the outdoor antenna unit 112 may be communicatively coupled to each other via a home network local area network 202 (e.g., a Wi-Fi network or a wired Ethernet network). An Ethernet switch 204 (e.g., an access point) may be optionally used to facilitate home-network communication traffic. Two logical communication channels may be established between the STB 110 and the unit 112—a secure logical channel 206 and a second channel, e.g., an Ethernet communication channel 208. The secure channel 206 may use secure communication that is secured using the SC 212 and USIM 210. As further explained in detail below, a home subscriber server (HSS) 214 may provide credentials to an application server 216. The STB 110 may receive satellite programming and the credentials for the unit 112 over the satellite link. Once pairing is achieved, value added content 218 (e.g., advertisements, interactive data, program guide, etc.) may be successfully received over the cellular connection and provided to the STB 110 to enhance user experience of content viewing.

Figure 3:
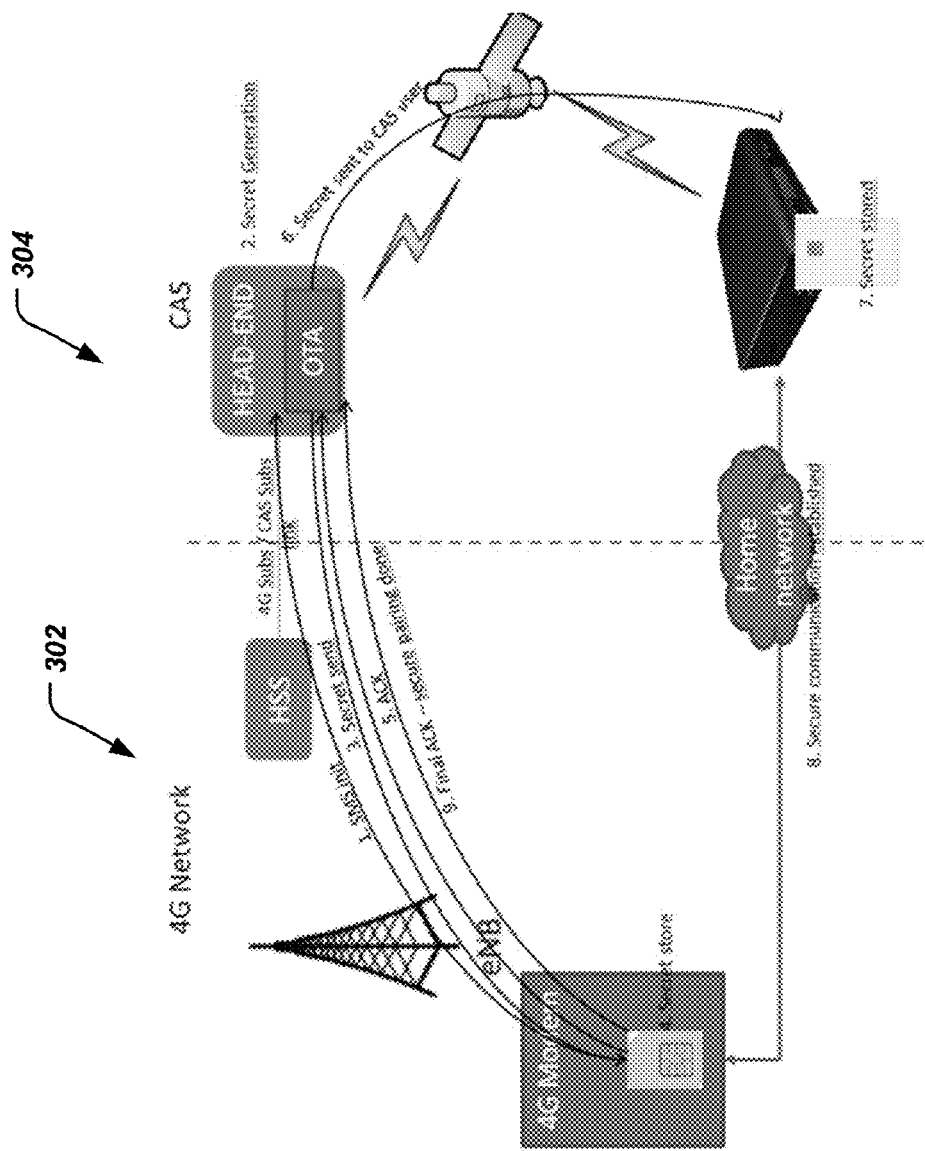
FIG. 3 depicts example messages exchanged in a communication system.

With reference to FIG. 3, example messages exchanged over a first network, e.g., a 4G network 302, and a second network, e.g., a satellite network 304, to pair the respective encryption modules with each other are described.

At initialization of the 4G network connectivity (e.g., during roof top installation by an installer), the SIM Card (i.e., UICC) uses a pre-installed Applet to communicate to the CAS OTA, using e.g. SMS (simple messaging system) communication (FIG. 3, step 1). The SIM Card is identified by the 4G Network (to be able to communicate) and at the OTA level through the phone number, and/or other available information that uniquely identifies the SIM card.

The OTA then generates a unique secret (FIG. 3, step 2),

The unique secret is sent to the SIM Card through the 4G network by using a secured communication channel so that the secret is not sent in clear to the SIM (e.g., an admin command through SMS) (FIG. 3, step 3).

The Secret is stored in the SIM card (FIG. 3, step 4).

An acknowledgement (e.g., via the SMS) can be sent in return to the OTA to confirm correct reception of the secret (FIG. 3, step 5).

After the OTA has created the secret for the SIM, it can transmit the secret to the CAS client (using the associated CAS account). The shared secret can be transmitted from CAS Head-End to STBs, through the usage of dedicated entitlement management message (EMM), which can be specific per user (using user's key Ku (FIG. 3, step 6)). This system enables secure transmission and reception of data set for a specific STB. The data set secured transmission is ensured through encryption and signature managed by the CAS. Once received the shared secret is managed by the secured elements in the STB (SC or Trusted Environment (NOCS, NASC, NVSR . . . )), and is stored securely on the device for further usage (FIG. 3, step 7).

After the shared secret is available on networks (SIM and SC), a dedicated and secured communication protocol can be instantiated between both elements (FIG. 3, step 8), to allow data set transmission from the STB to the SIM card. To achieve this, the SIM card may have a dedicated applet ready on it, to manage the dedicated communication protocol with the STB.

A final acknowledgement can be sent to the OTA, to finalize and validate the shared secret correct transmission, to the OTA. (FIG. 3, step 9)

With the shared secret, a strong pairing is then in place between both security modules in the two different networks.

Using the same communication's system (centralized in the OTA), the shared secret can be regularly updated (on both sides).

Also, from the initial shared secret (generated at the OTA), secondary secrets can be generated locally (SIM and SC) to create session keys, usable for a short period of time, during the communications between SIM and SC.

As the 4G LTE unit may be installed outdoor, it could be possible to get access to the device, sniff the Ethernet cable or replace the USIM with a cloned one. In some embodiments, an application/applet may be implemented in the UICC, managing the secure connection with the SC according to a secure protocol. The UICC may run multiple applications in parallel, one is the USIM for network access, others custom made can be defined according to the UICC standard interfaces.

Some beneficial aspects of pairing include:

Creating a strong/secure link between CAS word (SC-STB) and 4G (SIM card)

Enabling an encrypted tunnel in the communication between SIM and SC/STB.

Managing the protection of data between 4G network—mainly CAS operator's data, like enhanced video content—to the STB. Data on the 4G network will transit encrypted (intrinsically done by the 4G network communications protocols) and are decrypted in the 4G Modem. Thus, without a dedicated system, this data will be transmitted in the clear in the home network. 2 solutions here:

In some embodiments, data/content is already encrypted for the dedicated end user (CAS End user is identified at the 4G network thought the OTA-HSS link (Head-End link), or through the home network pairing, dedicated information can be sent to the 4G operator identifying the CAS AND 4G network user). Thus data can be directly encrypted for the CAS environment before being sent to the user.

In some embodiments, data is encrypted by the 4G network, and is decrypted on the modem, where a secured VPN is set up from the Modem to the STB, using the pairing. Thus data is not exchanged in clear between modem and STB. Other local network data can stay in clear (e.g., web data requested by a local laptop http session, in the home network)

One advantage of the pairing is that if anybody is exchanging the SIM cards either intentionally or accidentally or is running any other kind of attack it can be detected and the content over the 4G LTE access is not delivered to the set-top box.

Also, one aspect of the technique is to avoid the usage of the 4G SIM Card in a different environment than the 4G+CAS, as created by the pairing.

In case attacks or modifications are detected the set-top box can send a block message to stop content delivery over the compromised network technology (in this case the cellular access).

In some embodiments, the validity of the pairing may be checked on a regular basis. In one beneficial aspect, this check may verify and validate to the 4G network that the SIM card is correctly used as supposed (e.g., in the roof modem). Indeed, such SIM card may be usable directly in a 4G enabled phone, and removing it from the roof modem may be possible. By using regular checks of the protected communication initiated by the STB/SC, the CAS system in the home can validate that the appropriate card is in place and in good use. This check can be regular, or on command, from the CAS Head-End, and may result in immediate status feedback returned to the Head-End, through the 4G Network. If something fails (e.g., SIM card not present), then the feedback can be stored in the STB for future upload (once the network is back online). Such regular or remote monitoring helps having a clear picture of the global network, in a CAS-controlled way. Bad usage of the 4G SIM card could then be quickly identified, not only at the 4G network level, but also CAS level.

Figure 4:
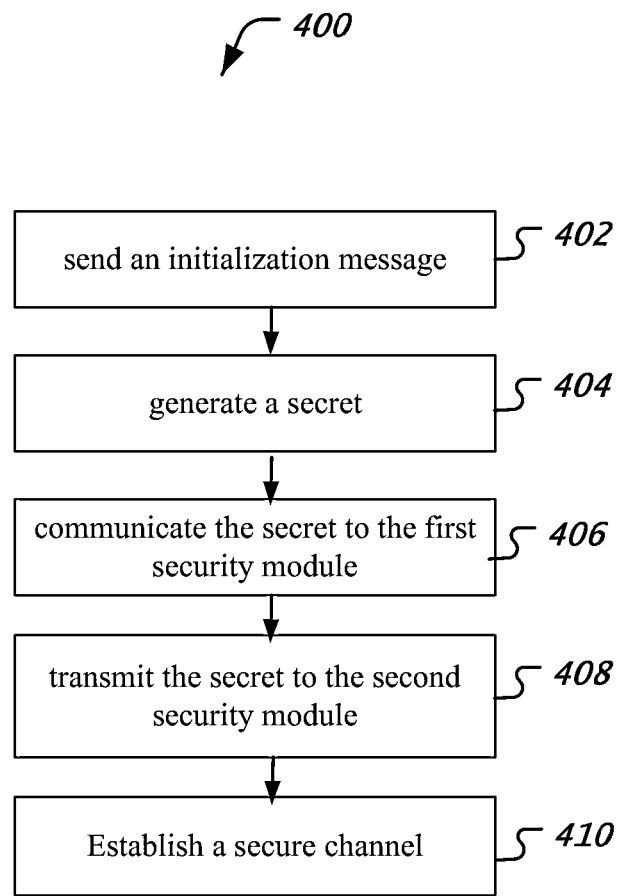
FIG. 4 is a flowchart of an example method of controlling operation of a security module.

FIG. 4 is a flow chart representation of a process 400 of pairing a first security module operable in first communication network with a second security module operable in a second communication network, whereby operation of the first security module is controlled by the second security module.

At 402, an initialization message is sent from the first communication network to the second communication network, the initialization message uniquely identifying the first security module.

At 404, a secret is generated based on the initialization message.

At 406, the secret to the first security module via the first communication network.

At 408, the secret is transmitted to the second security module via the second communication network.

At 410, using the secret, a secure channel is established between the second security module and the first security module via a third communication link that is different from the first communication network and the second communication network. The third communication link may be, e.g., established as a home area network (wired or wireless) such as a Wi-Fi network or may be a peer-to-peer type communication link, e.g., using wired Ethernet or USB connectivity or using Bluetooth or Wi-Fi peer-to-peer mode.

In some embodiments, the method 400 further includes periodically verifying presence of the first security module in the third communication link, or the communication network across which the third communication link operates, and issuing an error message when the verification fails In some disclosed embodiments, a system for providing content over a first communication network and a second communication network includes a first security module (e.g., a SIM card) and a second security module (e.g., a smartcard) operable at a user premise, a home server (e.g., HSS 214) operating in the first communication network (e.g., 302), configured to send an initialization message from the first communication network to the second communication network (e.g., 304), the initialization message uniquely identifying the first security module, a secret generator (e.g., an encryption key generation server or a software application or a combination of hardware/software) that generates a secret based on the initialization message, an application server that communicates the secret to the first security module via the first communication network, and transmits the secret to the second security module via the second communication network, and causing the second security module to establish, using the secret, a secure channel (e.g., using a IP Sec tunnel, an SSL connection, etc.) between the second security module and the first security module via a third communication link (a peer-to-peer connection as described above, or part of a home area network) that is different from the first communication network and the second communication network.

Figure 5:
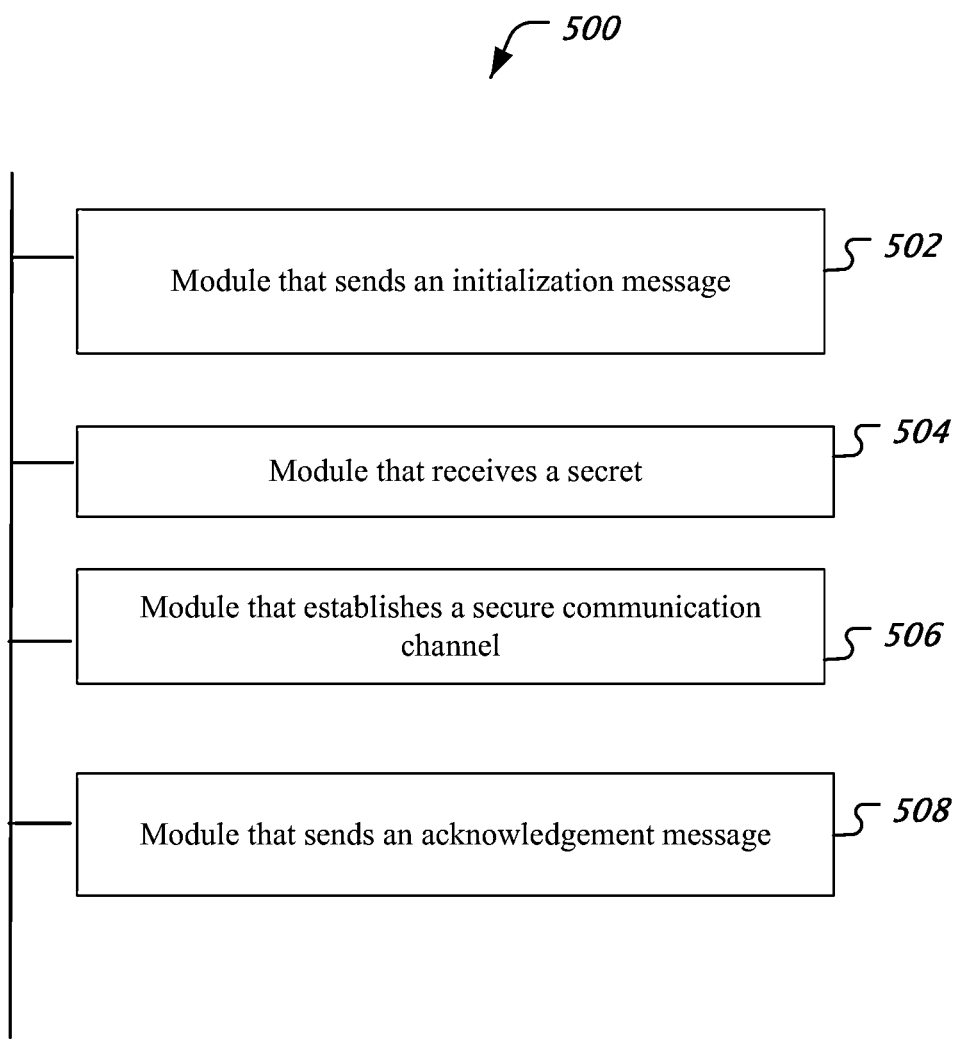
FIG. 5 depicts an example apparatus for use in a communication system.

FIG. 5 is a block diagram representation of an example of an apparatus for operation in a communication system. The module 502 is for sending an initialization message to an application server via a wireless communication network. The initialization message may be sent as an SMS using cellular telephony standards. The module 504 is for receiving a secret that was generated based on an identity included in the initialization message. The module 506 is for establishing a secure communication channel over a communication link such as a home area network or a peer-to-peer (cabled or wireless) communication link. The module 508 is for sending an acknowledgement message via the wireless communication network, indicating successful establishment of the secure communication channel. In some embodiments, the received secret is acknowledged via a separate message. In some embodiments, a module responds to periodic communication messages over the secure channel to establish the presence of the apparatus in the home area network or across the peer-to-peer link. In some embodiments, a content decryption module receives value-add content and provides the content to a set-top box over the home area network or the peer-to-peer link.

It will be appreciated that techniques for pairing up two different security modules that use two different encryption technologies for operation in two different networks are disclosed. In one advantageous aspect, one of the security modules, which may be prone for duplication or theft, is logically tethered to the other security module via the pairing. For example, after pairing is successfully performed, the first security module may be usable in a wide area network only when its presence in a local network, such as a home network of a subscriber, or a near field communication network, can be detected and verified by the second security module.

It will further be appreciated that the disclosed techniques may be used to provide a two-way interactive channel for carrying out-of-band value add content to the user and carry user interaction messages to the network can be added to a traditionally one-way network such as a satellite pay television network. The two-way interactive channel may use an off-the-shelf technology such as LTE, but at the same time, protect the equipment from piracy or unauthorized use by securely pairing the cellular receiver with the identity of the satellite pay TV subscriber.

The disclosed and other embodiments, the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of controlling operation of a first security module circuit operable in a first communication network by a second security module circuit operable in a second communication network having a different type of communication than the first communication network, the method comprising:
   sending, with a home server operating in the first communication network, an initialization message from the first communication network to the second communication network, the initialization message uniquely identifying the first security module circuit;
   generating, with a secret generator, a secret based on the initialization message;
   communicating, with an application server, the secret to the first security module circuit via the first communication network;
   transmitting, with the application server, the secret to the second security module circuit via the second communication network; and
   establishing, with the second security module circuit and using the secret, a secure channel between the second security module circuit and the first security module circuit via a third communication link that is different from the first communication network and the second communication network.

2. The method of claim 1 further comprising:
periodically verifying presence of the first security module circuit in the third communication network; and
issuing an error message when the verification fails.

3. The method of claim 2, further comprising:
disabling, upon receiving the error message, operation of the second security module circuit in the second communication network.

4. The method of claim 1, wherein the second communication network is a one-way communication network.

5. The method of claim 1, wherein the first communication network comprises a cellular network and wherein the first security module circuit comprises a subscriber identity module circuit.

6. The method of claim 1, wherein the second communication network comprises a satellite broadcast network.

7. The method of claim 1, wherein the third communication link comprises a user premises network.

8. The method of claim 1, further comprising:
providing multimedia content over the second communication network; and
providing value-added content related to the multimedia content over the first communication network.

9. The method of claim 1, wherein the first security module circuit and the second security module circuit include decryption keys used for decrypting data using different decryption technologies.

10. The method of claim 1, wherein the first security module circuit and the second security module circuit provide different physical form factors and security.

11. A system for providing content over a first communication network and a second communication network, the system comprising:
a first security module circuit and a second security module circuit operable at a user premises;
a home server operating in the first communication network, configured to send an initialization message from the first communication network to the second communication network, the initialization message uniquely identifying the first security module circuit;
a secret generator that generates a secret based on the initialization message; and
an application server that communicates the secret to the first security module via the first communication network and transmits the secret to the second security module circuit via the second communication network; wherein the second security module circuit is configured to establish, using the secret, a secure channel between the second security module circuit and the first security module circuit via a third communication link that is different from the first communication network and the second communication network.

12. The system of claim 11, wherein the second security module circuit is further configured to:
periodically verify presence of the first security module circuit via the third communication link; and
issue an error message when the verification fails.

13. The system of claim 12, wherein the first communication network comprises a authentication server configured to disable, upon receiving the error message, operation of the second security module circuit in the second communication network.

14. The system of claim 11, wherein the second communication network is a one-way communication network.

15. The system of claim 11, wherein the first communication network comprises a cellular network and wherein the first security module circuit comprises a subscriber identity module circuit.

16. The system of claim 11, wherein the second communication network comprises a satellite broadcast network.

17. The system of claim 11, wherein the third communication link comprises a user premises network.

18. The system of claim 11, further comprising:
a head-end configured to provide multimedia content over the second communication network; and
an interactive application server configured to provide value-added content related to the multimedia content over the first communication network.

19. The system of claim 11, wherein the first security module circuit and the second security module circuit include decryption keys used for decrypting data using different decryption technologies.

20. The system of claim 11, wherein the first security module circuit and the second security module circuit provide different physical form factors and security.

21. The system of claim 11, wherein the initialization message is sent as an simple messaging system (SMS) message.

22. The system of claim 11, further including:
a content decryption module circuit that receives value-add content via the first communication network and transmits the value-add content over the third communication link.

* * * * *